US012688626B2

(12) United States Patent
Shukla et al.

(10) Patent No.: US 12,688,626 B2
(45) Date of Patent: Jul. 21, 2026

(54) METHODS FOR GENERATING A HIERARCHICAL GRAPHICAL USER INTERFACE OF A MARKETING TOOL

(71) Applicant: Jones Lang LaSalle IP, Inc., Chicago, IL (US)

(72) Inventors: Aviral Shukla, Jankipuram (IN); Jena Delaney, Atlanta, GA (US); Cassie Byard, London (GB); Gillam Campbell Sinharoy, Atlanta, GA (US); James Begley, Peachtree Corners, GA (US)

(73) Assignee: JONES LANG LASALLE IP, INC., Chicago, IL (US)

( * ) Notice: Subject to any disclaimer, the term of this patent is extended or adjusted under 35 U.S.C. 154(b) by 97 days.

(21) Appl. No.: 18/745,407

(22) Filed: Jun. 17, 2024

(65) Prior Publication Data

US 2025/0384600 A1 Dec. 18, 2025

(51) Int. Cl.
| | |
|---|---|
| *G06T 11/26* | (2026.01) |
| *G06F 3/0482* | (2013.01) |
| *G06Q 30/0201* | (2023.01) |

(52) U.S. Cl.
CPC ............ *G06T 11/26* (2026.01); *G06F 3/0482* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 10,921,972 B2 * | 2/2021 | Park | G06F 3/0486 |
| 2018/0174060 A1 * | 6/2018 | Velez-Rojas | G06N 5/02 |

* cited by examiner

*Primary Examiner* — Robert J Craddock
(74) *Attorney, Agent, or Firm* — Troutman Pepper Locke LLP

(57) ABSTRACT

A method, system, and non-transitory computer readable medium includes providing, by the computing device, a hierarchal graphical user interface with selectable attributes and visualization options in response to a prompt from a client device. The hierarchal graphical user interface can be generated prior to the transmission to the client device. Next, the method can include generating, by the computing device, a report by inputting the prompt, selected attributes, and a selected visualization option into a machine learning model to generate the report. The machine learning model can be configured to use marketing data, building data, or combinations thereof for the generation of the report. Then, the method can include updating and providing, by the computing device, a modified hierarchal graphical user interface to the client device, where the modified hierarchal graphical user interface is the hierarchal graphical user interface modified to comprise the report.

20 Claims, 17 Drawing Sheets

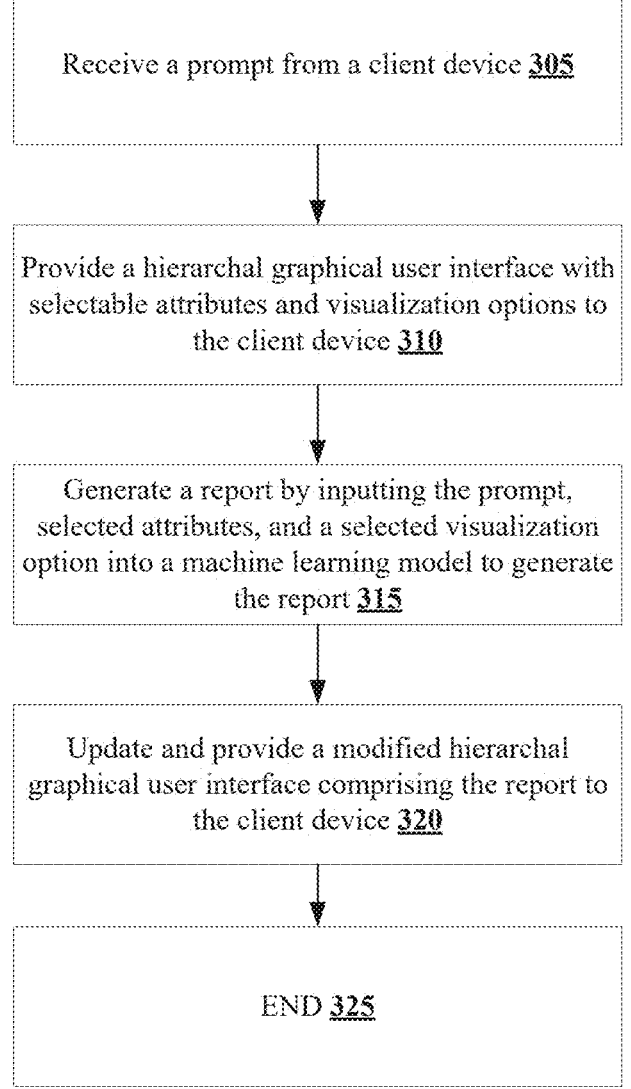

Receive a prompt from a client device 305

Provide a hierarchal graphical user interface with selectable attributes and visualization options to the client device 310

Generate a report by inputting the prompt, selected attributes, and a selected visualization option into a machine learning model to generate the report 315

Update and provide a modified hierarchal graphical user interface comprising the report to the client device 320

END 325

METHODS FOR GENERATING A HIERARCHICAL GRAPHICAL USER INTERFACE OF A MARKETING TOOL

FIELD

This technology generally relates to generating hierarchical graphical user interfaces and, more particularly, to methods for generating a marketing tool and devices thereof.

BACKGROUND

Existing prior tools for the generation of hierarchical graphical user interfaces responsive to prompts in environments requiring accurate real time data and visualizations are lacking. In particular, these prior tools often require the use of stored templates with fixed fields and limited, if any, options for correlated and customized real time generation of visualizations based on those received prompts. Prior tools can take months to create and by the time a sufficient tool is generated, the data and graphics are often outdated. By way of example, brokers require in real time the generation of accurate market data and visualizations responsive to prompts for particular pitches and sales, however currently no effective automated mechanism for generating such a report exists.

SUMMARY

A method that generates a report as a marketing tool by generating hierarchical graphical user interfaces includes providing, by the computing device, a hierarchal graphical user interface with selectable attributes and visualization options in response to a prompt from a client device. The hierarchal graphical user interface can be generated prior to the transmission to the client device. Next, the method can include generating, by the computing device, a report by inputting the prompt, selected attributes, and a selected visualization option into a machine learning model to generate the report. The machine learning model can be configured to use marketing data, building data, or combinations thereof for the generation of the report. Then, the method can include updating and providing, by the computing device, a modified hierarchal graphical user interface to the client device. The modified hierarchal graphical user interface can be the hierarchal graphical user interface modified to comprise the report.

A non-transitory computer readable medium having stored thereon instructions comprising machine executable code which when executed by at least one processor, causes the processor to provide a hierarchal graphical user interface with selectable attributes and visualization options in response to a prompt from a client device. The hierarchal graphical user interface can be generated prior to the transmission to the client device. Next, the instructions can cause the processor to generate a report by inputting the prompt, selected attributes, and a selected visualization option into a machine learning model to generate the report. The machine learning model can be configured to use marketing data, building data, or combinations thereof for the generation of the report. Then, the instructions can cause the processor to update and provide a modified hierarchal graphical user interface to the client device. The modified hierarchal graphical user interface can be the hierarchal graphical user interface modified to comprise the report.

A computing apparatus including at least one of configurable hardware logic configured to be capable of implementing or a processor coupled to a memory and configured to execute programmed instructions stored in the memory to provide a hierarchal graphical user interface with selectable attributes and visualization options in response to a prompt from a client device. The hierarchal graphical user interface can be generated prior to the transmission to the client device. Next, the processor can execute programmed instructions to generate a report by inputting the prompt, selected attributes, and a selected visualization option into a machine learning model to generate the report. The machine learning model can be configured to use marketing data, building data, or combinations thereof for the generation of the report. Then, the processor can execute programmed instructions to update and provide a modified hierarchal graphical user interface to the client device. The modified hierarchal graphical user interface can be the hierarchal graphical user interface modified to comprise the report.

This technology provides a number of advantages including providing a method, non-transitory computer readable medium, and apparatus that enable the generation of hierarchical graphical user interfaces with correlated real time data and customized visualization responsive to received and correlated historical prompts in a variety of different environments. Examples of the claimed technology are able to produce a quick, easy, and accurate statistics driven report using a hierarchal graphical user interface with a trained machine learning model. Examples of this technology provide an automated mechanism to effectively generate a report that would take months to edit. By way of example, the generated reports can allow a client to see in real time correlated data and customized visualizations how data and corresponding graphics for buildings compare to a competitive set across a certain market. This type of technology to enable the generation in real time of these hierarchical graphical user interfaces with accurately correlated data and customized visualization has not previously been available.

BRIEF DESCRIPTION OF THE DRAWINGS

FIG. 3 is an exemplary flowchart of an exemplary method of generating a hierarchal graphical user interface with marketing tools;

FIG. 6 is an exemplary interface of a plurality of graphical user interfaces for a hierarchal graphical user interface illustrating an exemplary prompt inserted as an input in an exemplary field along with additional selectable exemplary prompts;

FIG. 7 is an exemplary interface of a plurality of graphical user interfaces for a hierarchal graphical user interface illustrating exemplary interactive elements for a selection of attributes for the marketing tools;

DETAILED DESCRIPTION

Figure 1:
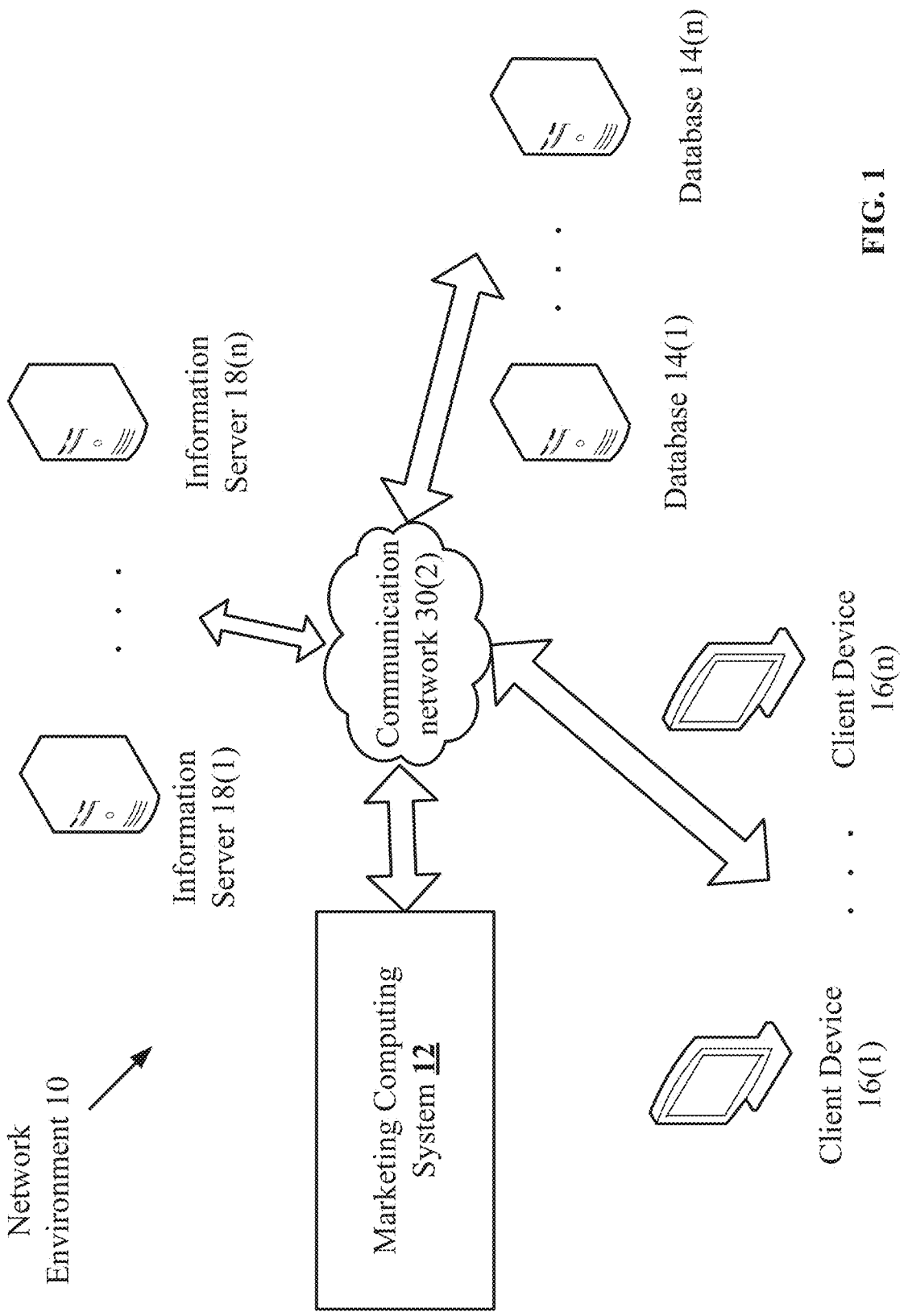
FIG. 1 is a block diagram of an example of an environment with a marketing computing system configured to generate a hierarchal graphical user interface with marketing tools.
Figure 2A:
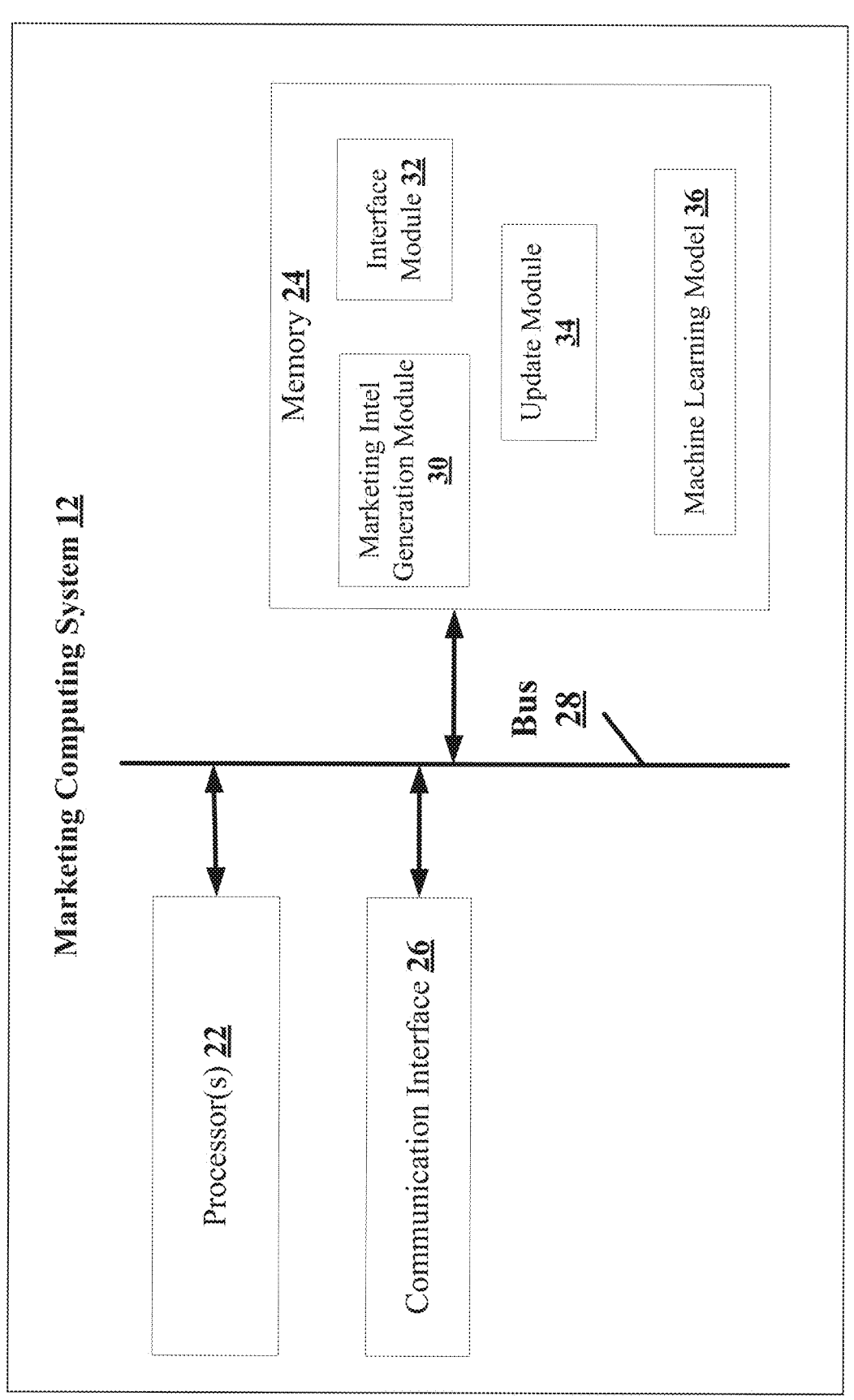
FIG. 2A is a block diagram illustrating an example of an architecture of a marketing computing system.

An environment 10 with an exemplary marketing computing system 12 is shown in FIGS. 1-2A. In this example, the environment 10 includes the marketing computing system 12, a plurality of databases 14(1)-14(n), a plurality of client devices 16(1)-16(n), and a plurality of information servers 18(1)-18(n), although the environment may comprise other types and/or numbers of other systems, devices, components, and/or other elements in other configurations. This technology provides a number of advantages including providing systems, methods, and non-transitory computer readable media that enable the generation of hierarchical graphical user interfaces with correlated real time data and customized visualization responsive to received and correlated historical prompts in a variety of different environments.

Referring to more specifically to FIGS. 1-2A, in this example, the marketing computing system 12 includes one or more processor(s) 22, a memory 24, and/or a communication interface 26, which are coupled together by a bus or other communication link 28, although the marketing computing system 12 can include other types and/or numbers of elements in other configurations.

The processor(s) 22 of the marketing computing system 12 may execute programmed instructions stored in the memory of the marketing computing system 12 for any number of functions and other operations as illustrated and described by way of the examples herein. The processor(s) 22 of the marketing computing system 12 may include one or more CPUs or general purpose processors with one or more processing cores, for example, although other types of processor(s) can also be used.

The memory 24 of the marketing computing system 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 24.

Accordingly, the memory 24 of the marketing computing system 12 can store one or more applications that can include computer executable instructions that, when executed by the marketing computing system 12, cause the marketing computing system 12 to perform actions, such as to generate marketing tools from data stored in one or more databases 14(1)-14(n) with one or more client devices 16(1)-16(n) and one or more information servers 18(1)-18(n) in the environment 10, and other actions as described and illustrated in the examples below with reference to FIGS. 1-11. The application(s) can be implemented as modules, programmed instructions, or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the marketing computing system 12 itself, may be located in virtual server(s) running in a cloud-based computing environment rather than being tied to one or more specific physical computing devices. Also, the application(s) may be running in one or more virtual machines (VMs) executing on the marketing computing system 12. Additionally, in one or more embodiments of this technology, virtual machine(s) running on the marketing computing system 12 may be managed or supervised by a hypervisor.

In this particular example, the memory 24 of the marketing computing system 12 may include a marketing intel generation module 30, an interface module 32, an update module 34, and a machine learning model (MLM) 36 which may be executed as illustrated and described by way of the examples herein, although the memory 24 can for example include other types and/or numbers of modules, platforms, algorithms, programmed instructions, applications, or databases for implementing examples of this technology. In some embodiments, the marketing intel generation module 30, the interface module 32, and/or the MLM 36 can be one unified module that performs the functions of the marketing intel generation module 30, the interface module 32, and/or the MLM 36.

The marketing intel generation module 30 may comprise executable instructions that are configured to collect data from any of the databases 14(1)-14(n) and generate data structures with the data in a useful and compact format. The marketing intel generation module 30 may also comprise executable instructions that are configured to execute other operations and/or functions as illustrated and described in greater detail by way of the examples herein, although this module may have executable instructions that are configured to execute other types and/or functions or other operations to facilitate examples of this technology, such as injecting the data or data structures into a prompt for the MLM 36 for the generation of the hierarchal graphical user interface with marketing tools, by way of example.

The interface module 32 may comprise executable instructions that are configured to generate a graphical user interface or a hierarchal graphical user interface including a plurality of graphical user interfaces using the data, data structures, or output from the MLM 36, as illustrated and described in greater detail by way of the examples herein, although this module may have executable instructions that are configured to execute other types and/or functions or other operations to facilitate examples of this technology, such as transmitting the hierarchal graphical user interface to one of the client devices 16(1)-16(n) by way of example.

The update module 34 may comprise executable instructions that are configured to update marketing data, building data, data, or combinations thereof stored in the databases 14(1)-14(n) as illustrated and described in greater detail by way of the examples herein, although this module may have executable instructions that are configured to execute other types and/or functions or other operations to facilitate examples of this technology.

The MLM 36 may be a machine learning model 6. In one example, one or more developers may fine-tune a pre-trained MLM 36 with marketing data, building data, or a real estate corpus to generate a fine-tuned MLM 36 for specific use cases. Although not illustrated, the plurality of information servers 18(1)-18(n) may host and/or manage a plurality of MLMs which may be pre-trained general purpose MLMs or fine-tuned MLMs. The plurality of information servers 18(1)-18(n) may be a cloud-based server or an on-premises server. The fine-tuned LLM 36 may be accessed using an application programming interface (API) for use in applications. In another example, the fine-tuned LLM 36 may be hosted by the plurality of information servers 18(1)-18(n) and managed remotely by the marketing computing system 12.

The MLM 36 can be a type of artificial intelligence-machine learning (AI/ML) model that is used to process natural language data for tasks such as natural language processing, text mining, text classification, machine translation, question-answering, response generation, or the like. The MLM 36 uses deep learning or neural networks to learn language features from large amounts of data. The MLM 36 is, for example, trained on a large dataset and then used to generate predictions or generate features from unseen data. The MLM 36 can be used to generate language features such as word embeddings, part-of-speech tags, named entity recognition, sentiment analysis, or the like. Unlike traditional rule-based NLP systems, the MLM 36 does not have to rely on pre-defined rules or templates to generate responses. Instead, the MLM 36 can use a probabilistic approach to language generation, where the MLM 36 can calculate the probability of each word in a response based on the patterns the MLM 36 learned from the training data.

The marketing computing system 12 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The marketing computing system 12 may be configured to adjust model parameters during training. Model parameters may include weights, coefficients, offsets, or the like. Training may be supervised or unsupervised.

The marketing computing system 12 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The marketing computing system 12 may be configured to optimize statistical models using known optimization techniques.

The marketing computing system 12 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The marketing computing system 12 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some examples, the marketing computing system 12 is configured to generate and/or train the MLM 36 to classify a dataset, consistent with disclosed examples.

The marketing computing system 12 can be configured to generate and/or use the MLM 36 which includes programs (scripts, functions, algorithms) to configure data for visualizations and provide visualizations of datasets and data models. This may include programs to generate graphs and display graphs. The marketing computing system 12 may include programs to generate histograms, scatter plots, time series, or the like. The marketing computing system 12 may also be configured to display properties of data models and data model training results including, for example, architecture, loss functions, cross entropy, activation function values, embedding layer structure and/or outputs, convolution results, node outputs, or the like on the one or more of the client devices 16(1)-16(n).

The communication interface 26 of the marketing computing system 12 operatively couples and communicates between the marketing computing system 12 and the one or more of databases 14(1)-14(n), the one or more of the client devices 16(1)-16(n), and the one or more information servers 18(1)-18(n), although other types and/or numbers of connections and/or communication networks can be used.

While the marketing computing system 12 is illustrated in this example as including a single device, the marketing computing system 12 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the marketing computing system 12.

Additionally, one or more of the devices that together comprise the marketing computing system 12 in other examples can be standalone devices or integrated with one or more other devices or apparatuses, such as in one of server devices or in one or more computing devices for example. Moreover, one or more of the devices of the marketing computing system 12 in these examples can be in a same or a different communication network including one or more public, private, or cloud networks, for example.

Although an exemplary marketing computing system 12 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in this marketing computing system 12, such as the marketing computing system 12, for example, may be configured to operate as virtual instances on the same physical machine. In other words, by way of example one or more of the marketing computing system 12 may operate on the same physical device rather than as separate devices communicating through communication network(s). Additionally, there may be more or fewer marketing computing system 12 than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to conduct steps necessary to implement the methods of the examples of this technology that are described and illustrated herein.

Figure 2C:
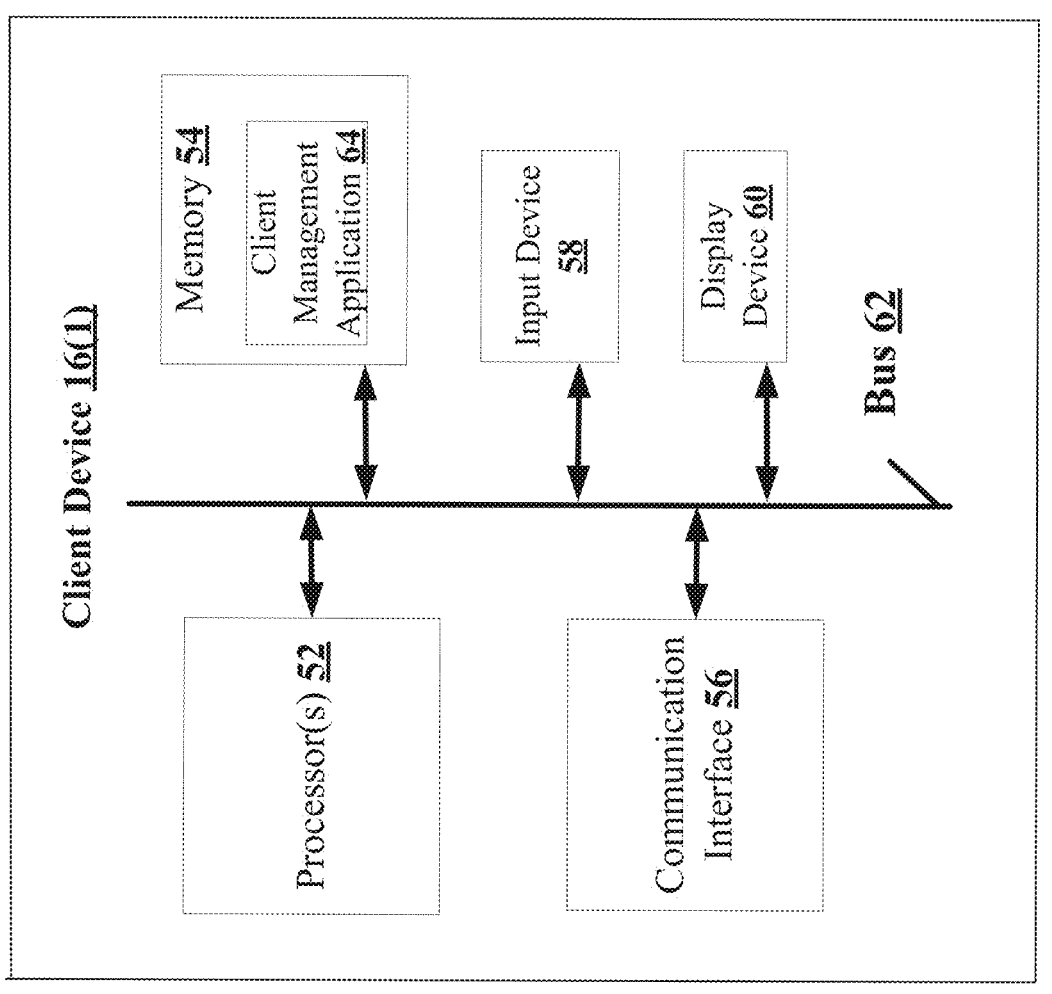
FIG. 2C is a block diagram illustrating an example of an architecture of a client device.
Figure 2B:
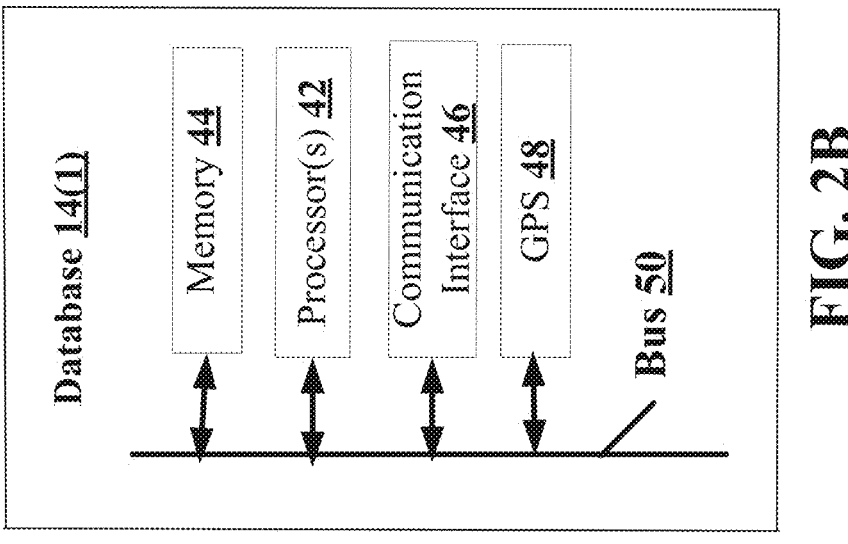
FIG. 2B is a block diagram illustrating an example of an architecture of a database.

Referring to FIGS. 1 and 2B, the plurality of databases 14(1)-14(n) may comprise a variety of different types and/or numbers of systems, devices, or other things in the environment 10, such as a variety of different marketing data, building data, data, or combinations thereof by way of example only. In this example, the marketing computing system 12 has a table, a data structure, or other manner organizing the marketing data, building data, data, or combinations thereof by way of example, although other manners for categorizing and organizing the data can be used. In this example, each of the databases 14(1)-14(n) at least have the same following structure and operation as shown in the example of the database 14(1) shown in FIG. 2B, although databases 14(1)-14(n) with other types and/or numbers of other systems, devices, components, and/or other elements may be used. Additionally, in this example, the database 14(1) has one or more processors 42, a memory 44, a communication interface, and a global positioning system (GPS) device 48 which are coupled together by a bus or other communication link 50, although each database of data could have other types and/or numbers of systems, devices, components and/or other elements in other configurations.

Referring to FIGS. 1 and 2C, the plurality of client devices 16(1)-16(n) in this example includes any type of computing device that can participate in the generation of reports as marketing tools using data structures, marketing data, and building data in an environment 10 with a client management application 64, such as mobile computing devices, desktop computing devices, laptop computing devices, tablet computing devices, virtual machines (including cloud-based computers), or the like. In this example, each of the client devices 16(1)-16(n) at least have the same following structure and operation as shown in the example of the client device 16(1) shown in FIG. 2C, although client devices with other types and/or numbers of other systems, devices, components, and/or other elements may be used. Additionally in this example, the client device 16(1) includes one or more processor 52, a memory 54, a communication interface 56, an input device 58, and a display device 60, which are coupled together by a bus or other communication link 62, types and/or numbers of systems, devices, components, or other elements in other configurations. Additionally, in this example the memory 54 includes a client management application 64 which enables the client 16(1) to interact with the marketing computing system 12 and one or more of the databases 14(1)-14(n) as illustrated and described by way of the examples herein, although the memory 54 can include other programmed instructions, modules, applications, or other data for example.

The plurality of information servers 18(1)-18(n) in this example includes one or more processors, a memory, and a communication interface, which are coupled together by a bus or other communication link, although other numbers and/or types of network devices could be used. In this example, the information servers 18(1)-18(n) can be located at different locations and may each process requests received from the marketing computing system 12 and/or the client devices 16(1)-16(n) via the communication network(s) 20. Various data and other applications may be operating on the marketing computing system 12 and transmitting data (e.g., files or Web pages) to the marketing computing system 12 and/or the client devices 16(1)-16(n). The information servers 18(1)-18(n) may be hardware or software or may represent a system with multiple servers in a pool, which may include internal or external networks.

An exemplary method for generating hierarchal graphical user interfaces for marketing tools using one or more of the databases 14(1)-14(n) in the environment 10 with the marketing computing system 12 and one or more of the client devices 16(1)-16(n) will now be described with reference to FIGS. 1-11E.

Figure 6:
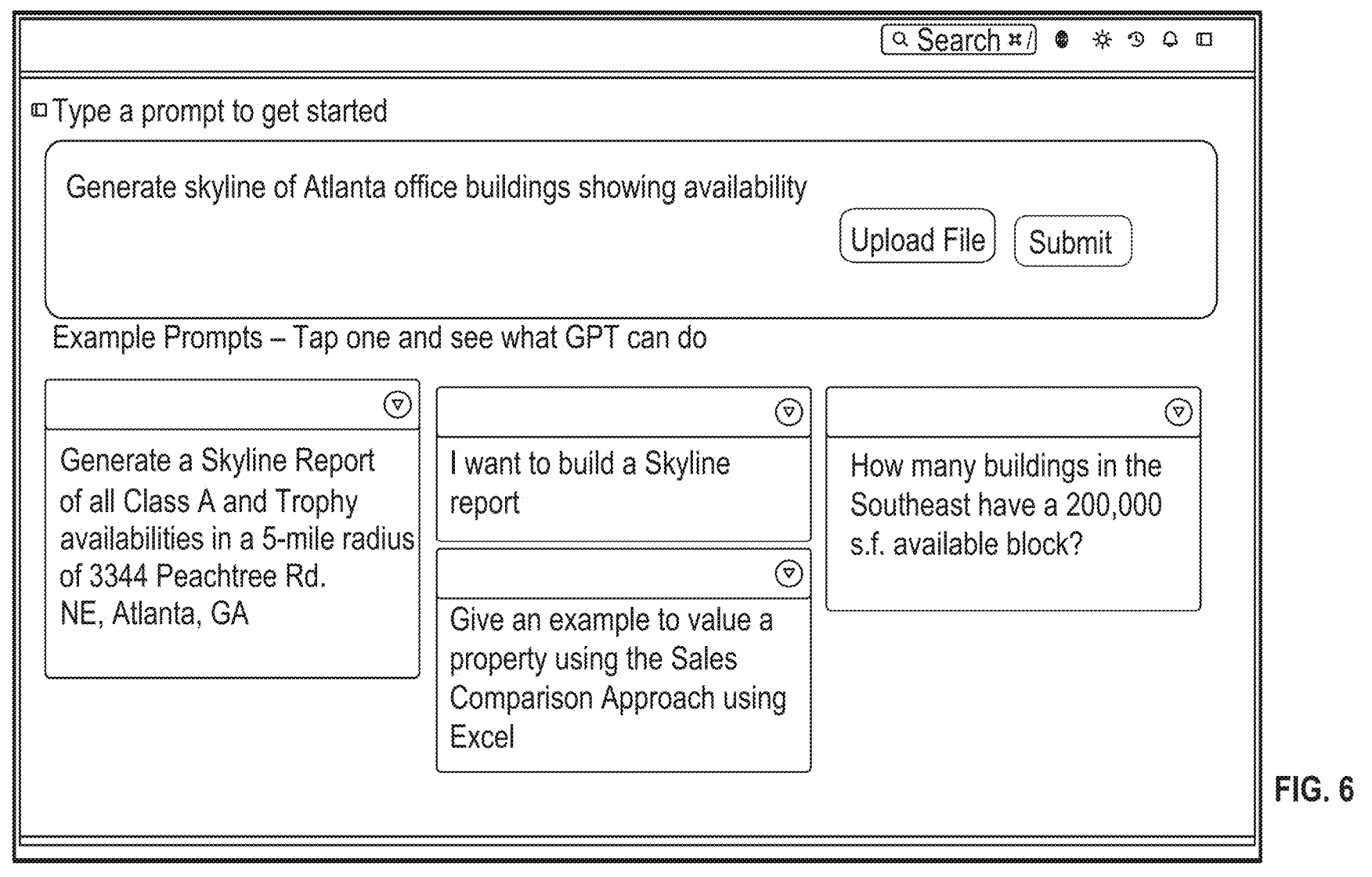

Referring more specifically to FIG. 3, in step 305, the marketing computing system 12 receives a prompt from a client at one of the client devices 16(1)-16(n). As illustrated in FIG. 6, the marketing computing system 12 can generate an interface comprising a field. The marketing computing system 12 can provide the interface to the client at the one of the client devices 16(1)-(n) and can receive, from the client at the one of the client devices 16(1)-(n), the prompt as text data as input through the field of the interface.

Additionally, as illustrated in FIG. 6, the interface can further comprise selectable exemplary prompts. The marketing computing system 12 can generate exemplary prompts as the selectable exemplary prompts based on historical prompts previously received from the client at the one of the client devices 16(1)-(n). In another example, the marketing computing system 12 can generate the exemplary prompts based on historical data associated with the building data, marketing data, and/or the client at the one of the client devices 16(1)-(n). The exemplary prompts can also be built in predetermined prompts (a list of predetermined prompts provided to the marketing computing system 12 for the exemplary prompts). After the exemplary prompts are generated, the marketing computing system 12 can modify the interface to further comprise the exemplary prompts. The exemplary prompts can be selectable elements (making the exemplary prompts—selectable exemplary prompts). When the client at the one of the client devices 16(1)-(n) selects one of the selectable exemplary prompts, in some examples, the selected exemplary prompt can be inserted as the text data for the input through the field of the interface. In other words, when the client at the one of the client devices 16(1)-(n) selects one of the selectable exemplary prompts, the marketing computing system 12 can receive the selected exemplary prompt from among the selectable exemplary prompts as the prompt for step 305.

In step 310, the marketing computing system 12 provides a hierarchal graphical user interface with selectable attributes and visualization options to the client device at one of the client devices 16(1)-16(n). The marketing computing system 12 can generate the hierarchal graphical user interface prior to the transmission to the client device. As illustrated in FIGS. 6-10, the hierarchal graphical user interface can include selectable elements of attributes of properties and visualization options, where the marketing computing system 12 utilizes selected elements among the selectable elements for the generation of reports. The selectable elements can be checkmark elements, drop down lists, text fields, text areas, sliders, date pickers, time pickers, file upload fields, toggle switch elements, multi-select boxes, color pickers, and other selectable elements known in the art. When the marketing computing system 12 receives a selection among the selectable elements, the marketing computing system 12 can generate a pop up window or a dialog window with additional selectable elements as illustrated in FIG. 10.

The marketing computing system 12 can also preselect elements for the attributes of properties or the visualization option based on the prompt previously received in step 305. In one example, as illustrated in FIG. 6, the marketing computing system 12 can receive a prompt stating 'generate skyline or Atlanta office buildings showing availability.' The marketing computing system 12 can preselect attributes of properties relating to availability such as direct availability data and sublet availability data and can preselect a visualization option of skyline report as well. The marketing computing system 12 can utilize the MLM 36 (that is pretrained to extract attributes of properties and visualization options from prompts) to preselect the attributes of properties and visualization options efficiently and accurately. The client device at one of the client devices 16(1)-16(n) can then send the marketing computing system 12 the selection of attributes of properties or visualization options and confirm the preselected elements or alter the selection of the attributes of properties and the visualization options. The marketing computing system 12 can then retrain the MLM 36 based on the confirmation or alterations from the client device at one of the client devices 16(1)-16(n) to improve pre-selections in the future.

Figure 8:
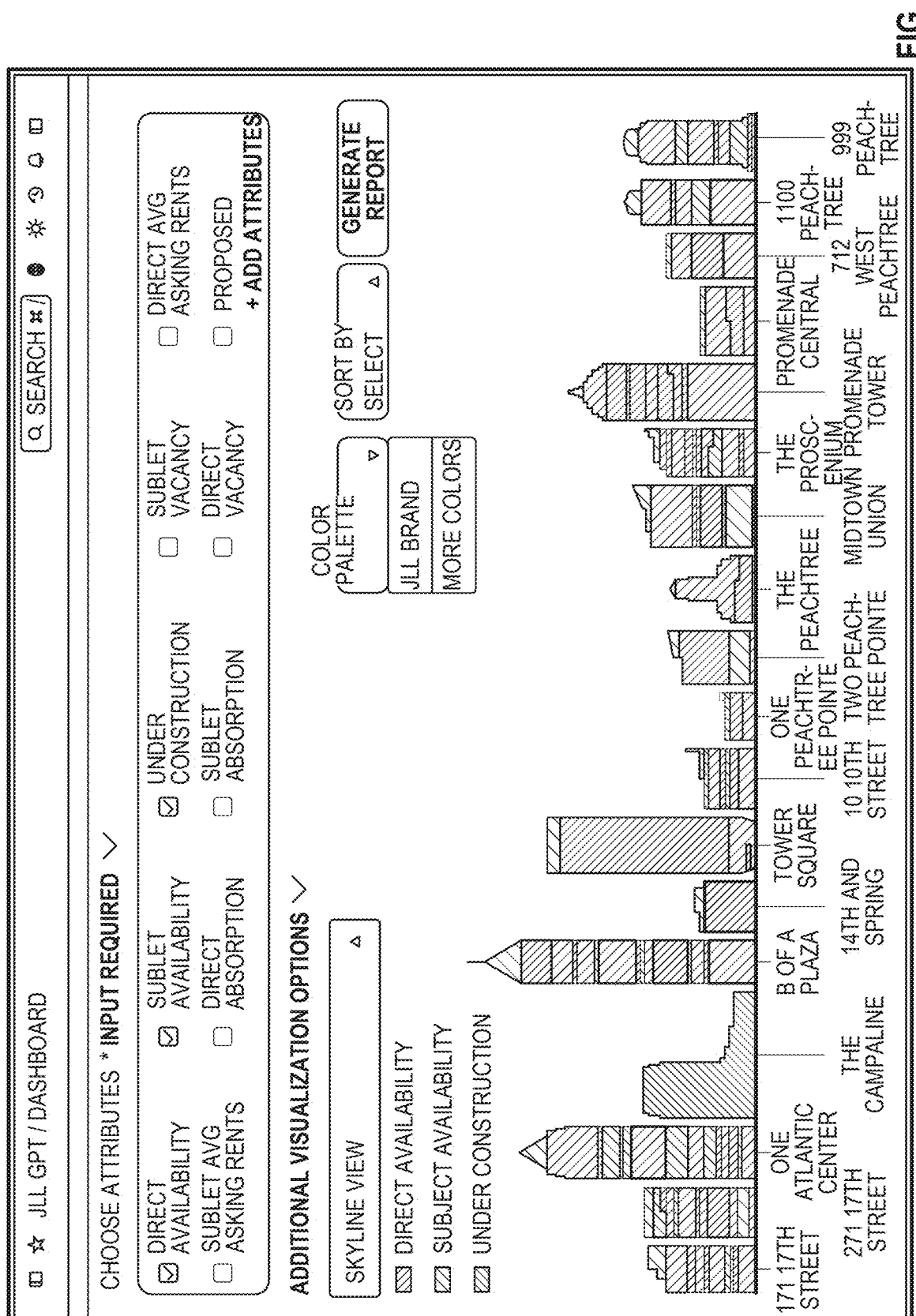
FIG. 8 is an exemplary interface of a plurality of graphical user interfaces for a hierarchal graphical user interface illustrating exemplary interactive elements with selected attributes for the marketing tools with an exemplary preview of a skyline report illustrating the selected attributes.
Figure 9:
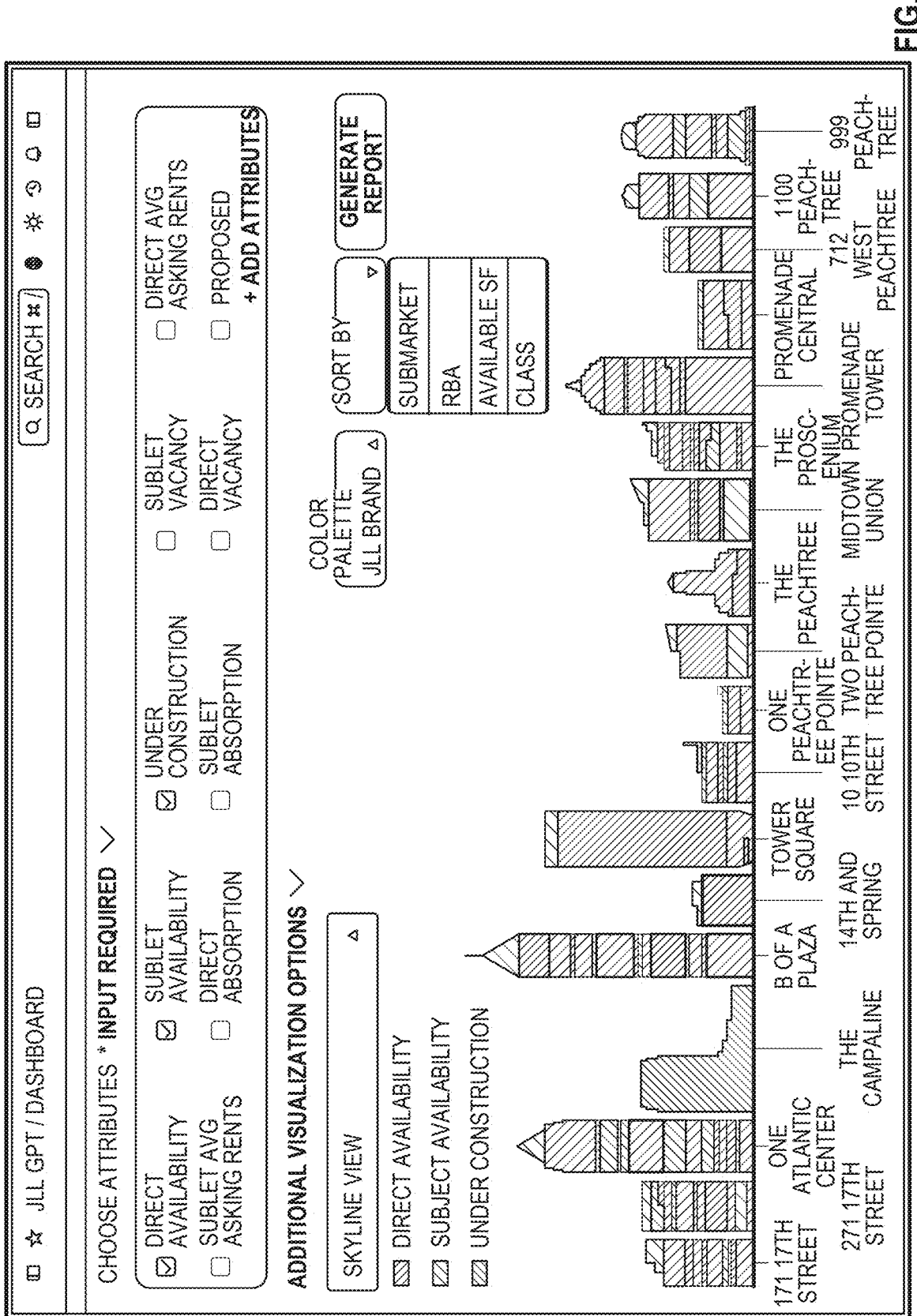
FIG. 9 is an exemplary interface of a plurality of graphical user interfaces for a hierarchal graphical user interface illustrating exemplary interactive elements with selected attributes for the marketing tools with an exemplary preview of a skyline report illustrating the selected attributes.
Figure 10:
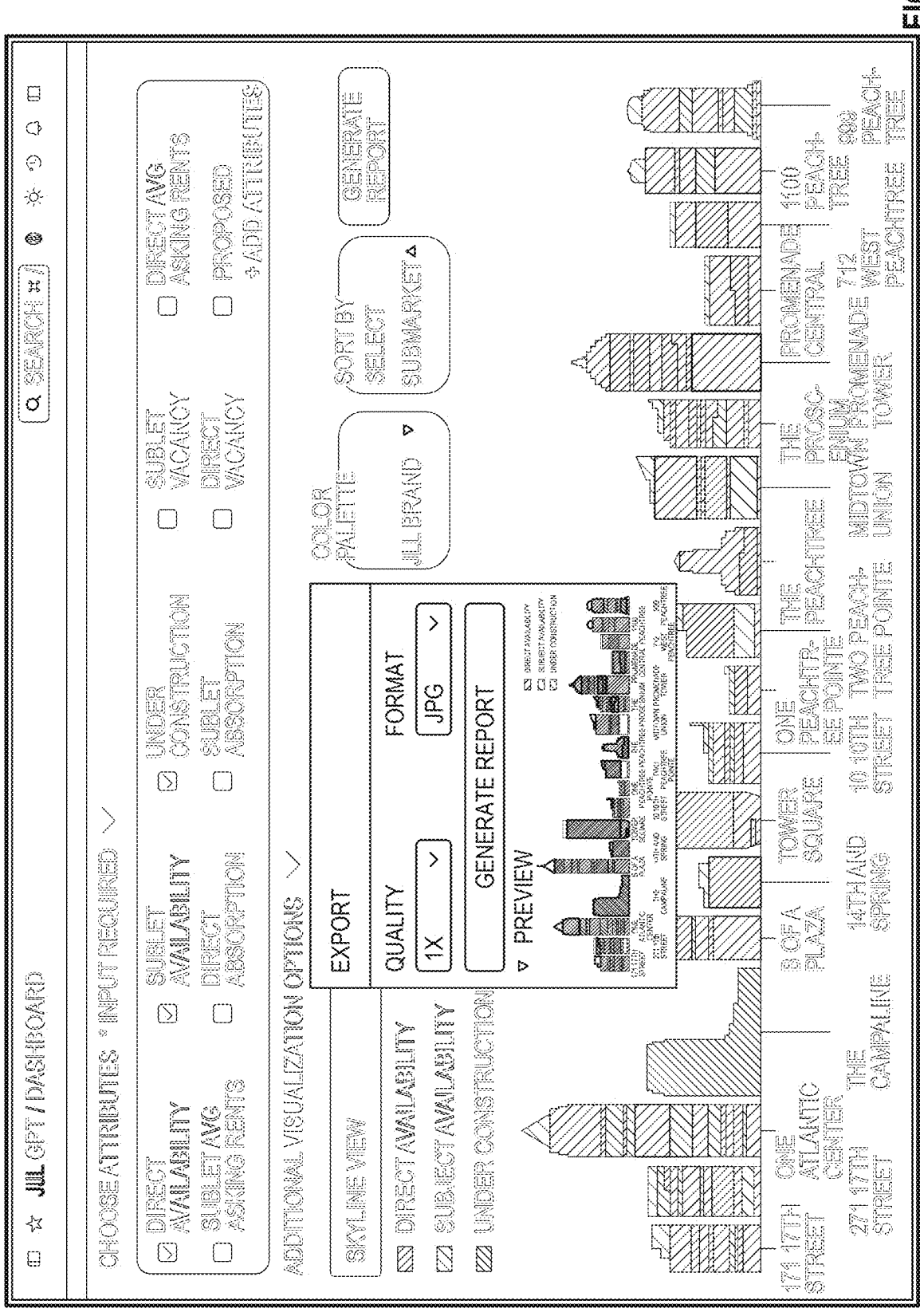
FIG. 10 is an exemplary interface of a plurality of graphical user interfaces for a hierarchal graphical user interface illustrating an exemplary dialog window with interactive elements for the selection of attributes for an export of a report.

After the marketing computing system 12 receives the selection of attributes of properties or visualization options, the marketing computing system 12 can modify the hierarchal graphical user interface to include a preview of a report as illustrated in FIGS. 8-10. The marketing computing system 12 can generate the preview of the report using the embodiments of step 315 outlined below. Additionally, the marketing computing system 12 can modify the preview of the report as the marketing computing system 12 receives additional selections of attributes of properties or visualization options so that the preview of the report includes the additional selections (allowing the preview of the report to be a real-time preview of current selections of attributes of properties or visualization options).

Attributes of Properties

In some examples, the selectable attributes can be among the selectable elements and can include an available selection of building data or marketing data (which can be housed in a server of the plurality of servers 18(1)-18(n), such as a Tableau server). The building data or marketing data can include data such as direct availability data, sublet availability data, total availability data, under construction data, direct vacancy data, sublet vacancy data, total vacancy data, direct vacancy available data, sublet vacancy available data, total vacant available data, direct average asking rents data, sublet average asking rents data, total asking rents data, direct absorption data (property sales against property purchases), sublet absorption data (resident move in against resident move out), total absorption data, proposed data, direct occupancy data, sublease occupancy data, total occupancy data, rentable building area data, average floor plate data, building status data (existing status, under construction status, proposed short-term status, proposed long-term status, proposed status), class data (trophy status, Class A status, Class B status, Class C status), tier data (tier 1 status, tier 2 status, tier 3 status, tier 4 status), building specialty data (creative status, lab status, lab/biotech status, government status, mixed-use status), owner occupied data (yes-full status, yes-partial status, no status) story type data (skyscraper, super-tall, high-rise, mid-rise, low-rise, single-story), distance to subway data (same block, 1-block, 2-blocks, within ¼ mile, within ½ mile, within 1 mile, more than 1 mile), construction type data (build-to-suit, owner-built, speculative ground-up, speculative redevelopment), building owner data, tenant data, property manager data, leasing company data, developer company data, building age data, year delivered data, year broke ground data, year renovated data, market data, submarket data, micro-market data, cluster data (central business district, suburbs), city data, county data, or combinations thereof. The selectable attributes can relate to attributes of physical properties (e.g., attributes of properties in the building data or marketing data). For example, a building in a city can have an office available for rent (e.g., sublet) or purchase (e.g., direct). The office can be included in the corresponding sublet availability data or direct availability data, respectively, according to their availability and status (i.e., whether the office is being sublet or purchased directly). The office that is available can have an asking rent amount for the rent or purchase—which can be included in the corresponding sublet average asking rents data or direct average asking rents data. In another example, if the office that is typically available for rent or purchase is vacant, but not currently on the market, then the office can be included in the corresponding sublet vacancy data or the direct vacancy data. If a new building is under construction and the new building has new residential apartments, each of the residential apartments or the new building can be included in the under construction data. The building can have a building status (existing, under construction, or proposed). As described above, buildings with existing building statuses can have vacancies, direct availabilities, sublets, etc. Buildings with under construction building statuses can have related under construction data. Buildings with proposed building statuses (where there are plans to build the building in the future) can have proposed data.

Figure 7:
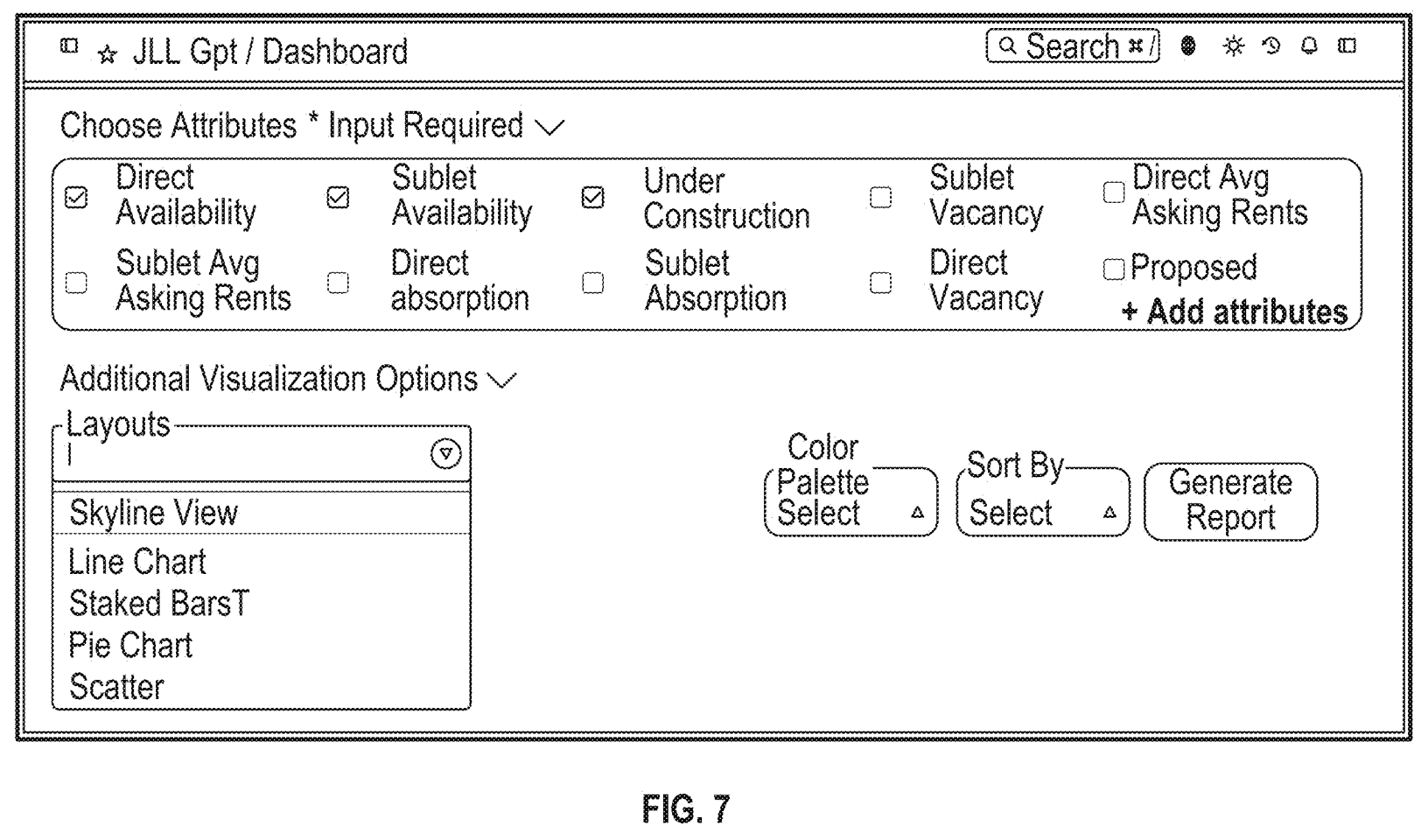

In some examples, the hierarchal graphical user interface can include an 'add attribute' selectable element as illustrated in FIG. 7. If the client device at one of the client devices 16(1)-16(n) selects the 'add attribute' selectable element, the marketing computing system 12 can generate a pop up window and transmit the pop up window to the client device at one of the client devices 16(1)-16(n). The pop up window can be a file selector dialog that allows the client device at one of the client devices 16(1)-16(n) to select a file or provide the marketing computing system 12 with custom data structures of custom attributes of properties.

Visualization Options

In some examples, the visualization options can be among the selectable elements and can include an available selection of a skyline report, a line chart, a stacked bars graph, a pic chart, a scatter plot graph, or combinations thereof. The selection of visualization options permits the client device at one of the client devices 16(1)-16(n) to select the type of graphical representation of the selected attributes to serve as the marketing tool.

Figure 4:
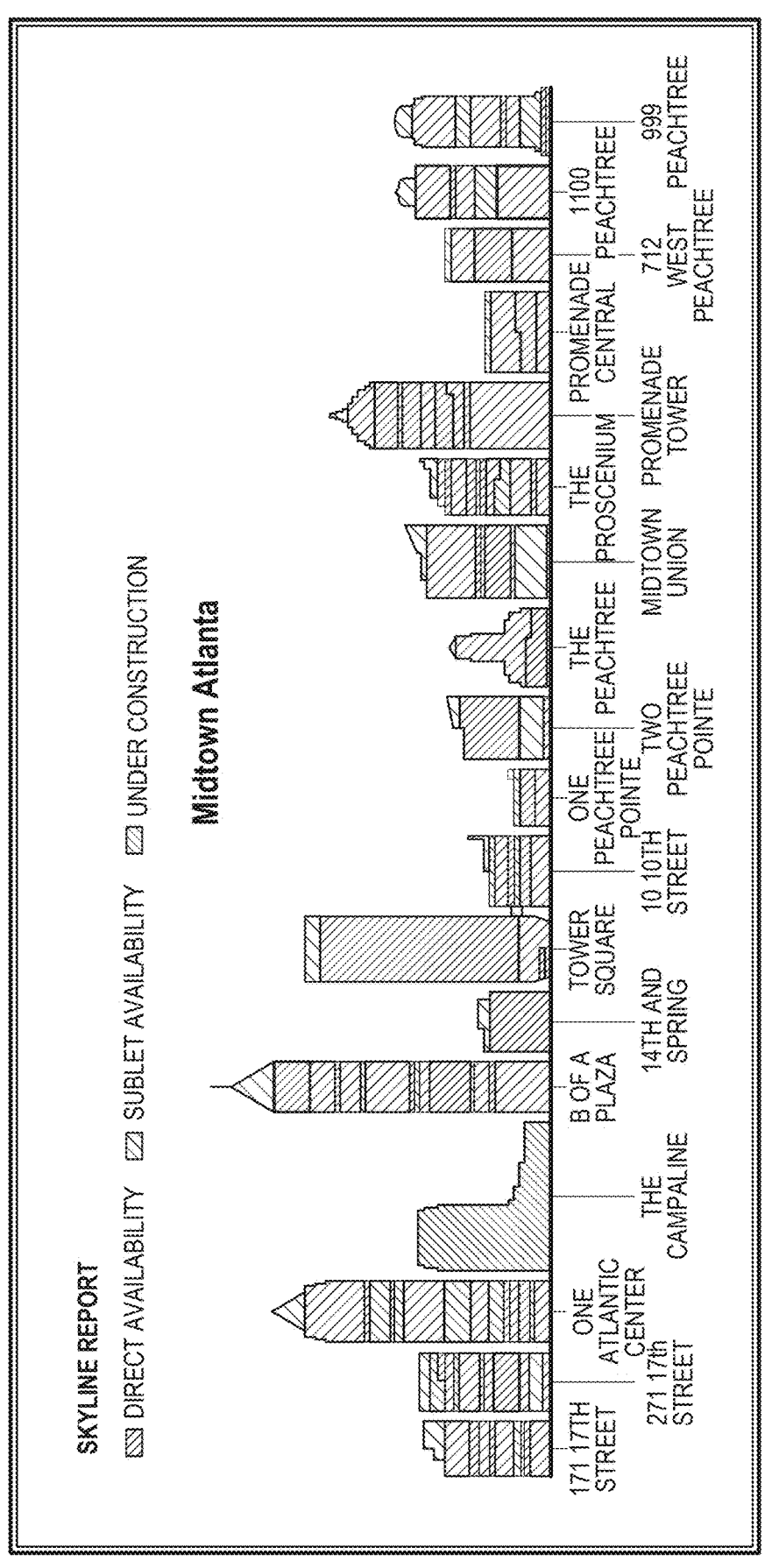
FIG. 4 is an exemplary interface of a plurality of graphical user interfaces for a hierarchal graphical user interface illustrating an exemplary skyline report of midtown Atlanta, Georgia generated using the marketing computing system.
Figure 5:
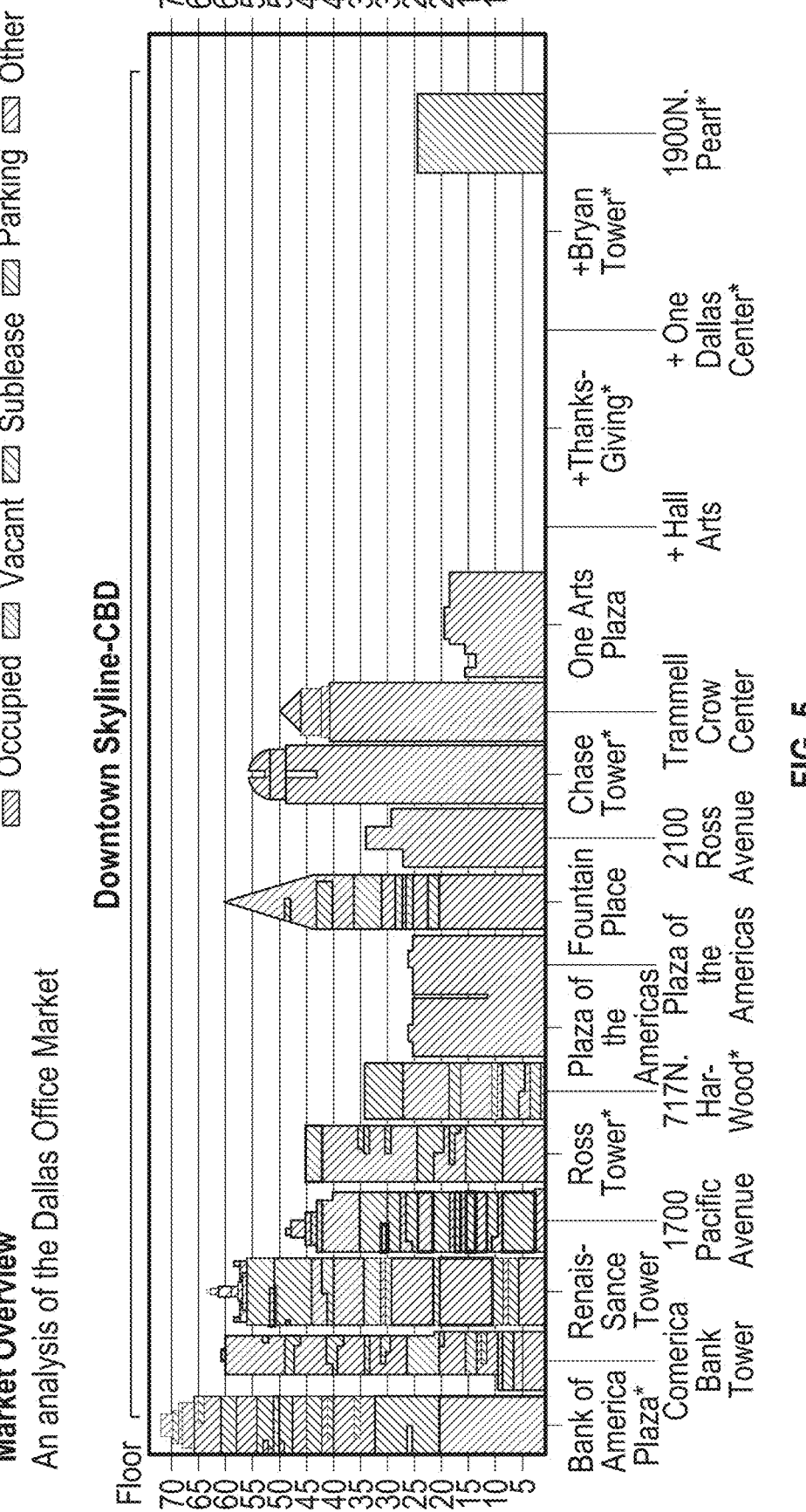
FIG. 5 is an exemplary interface illustrating an exemplary skyline report of downtown Dallas, Texas generated using the marketing computing system.

In one example, a broker could select a skyline report as the visualization option (such as the skyline reports illustrated in FIGS. 4, 5, and 11A-11C) to see the overall current market of a city, such as Midtown Atlanta, Georgia as illustrated in FIG. 4. In particular, the broker could want the skyline report to include building representations. The buildings in the skyline report can be the same shape of the corresponding physical building in the actual city (the Bank of America Plaza building in FIG. 4 is the same shape of the actual Bank of America Building in Atlanta, GA). An advantage of having the buildings in the skyline report accurately represent the physical skyline of the city is that a user can see how various buildings compare in terms of availability for decision-making processes (e.g., a landlord can see how their property compares to other buildings in a competitive market or a tenant can use the skyline report to see where they can locate). In the skyline report, the buildings can include shadings or colors representing selected attributes of properties. In a non-limiting example, in FIG. 4, the buildings in the skyline report of Midtown Atlanta includes shading or colors to differentiate direct availability data, sublet availability data, under construction data (or other building data or market data mentioned above) (additional shadings, colors, textures, or lines can be used to represent the different selected attributes for the report). The shadings or colors can differentiate the building data or market data on a per property level, based on square footage (part of a property may be vacant while another is occupied, etc.), based on tenants, based on submarkets, or combinations thereof.

Figure 11A:
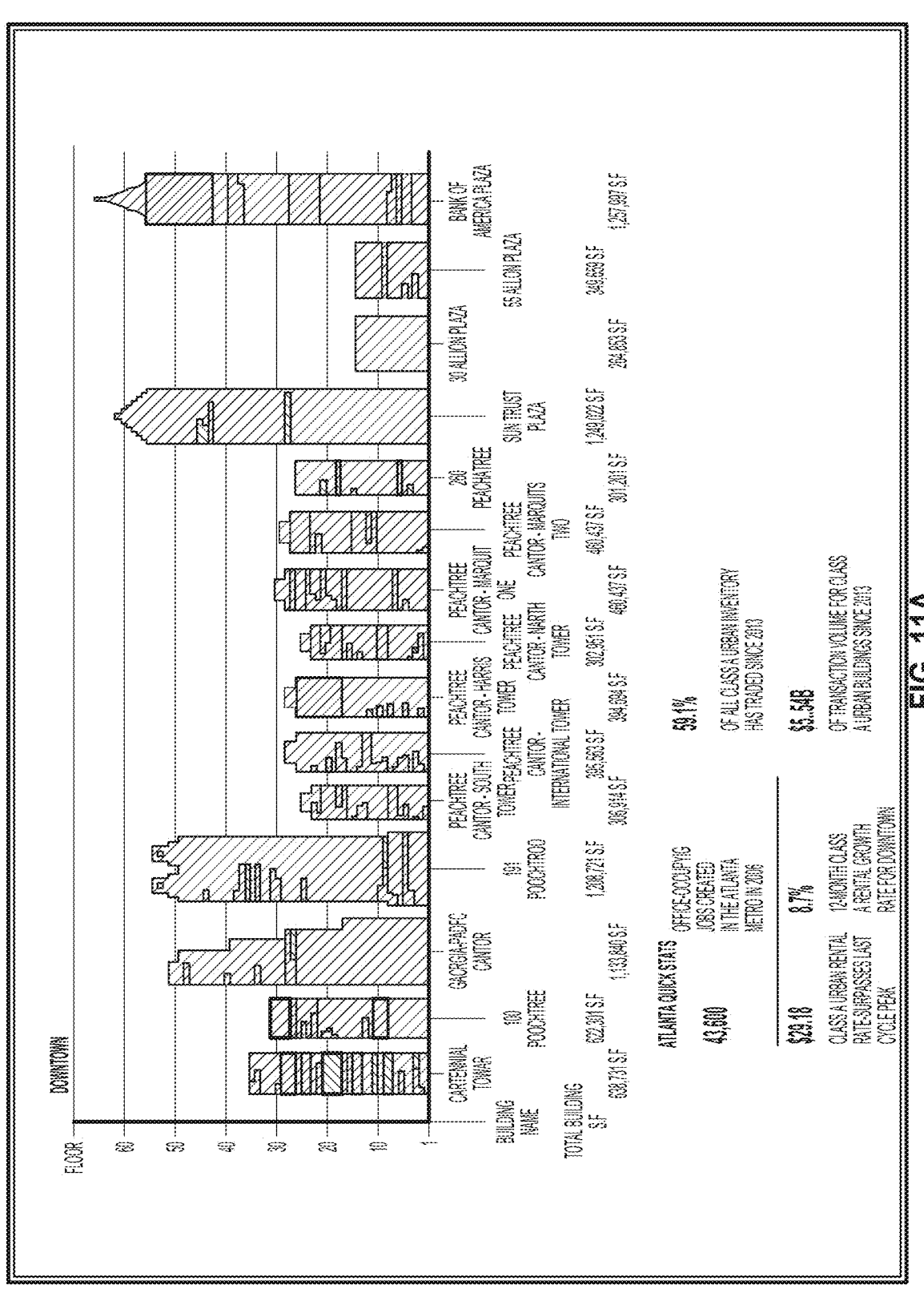
FIG. 11A is an exemplary interface illustrating an exemplary skyline report graph generated using the marketing computing system.
Figure 11B:
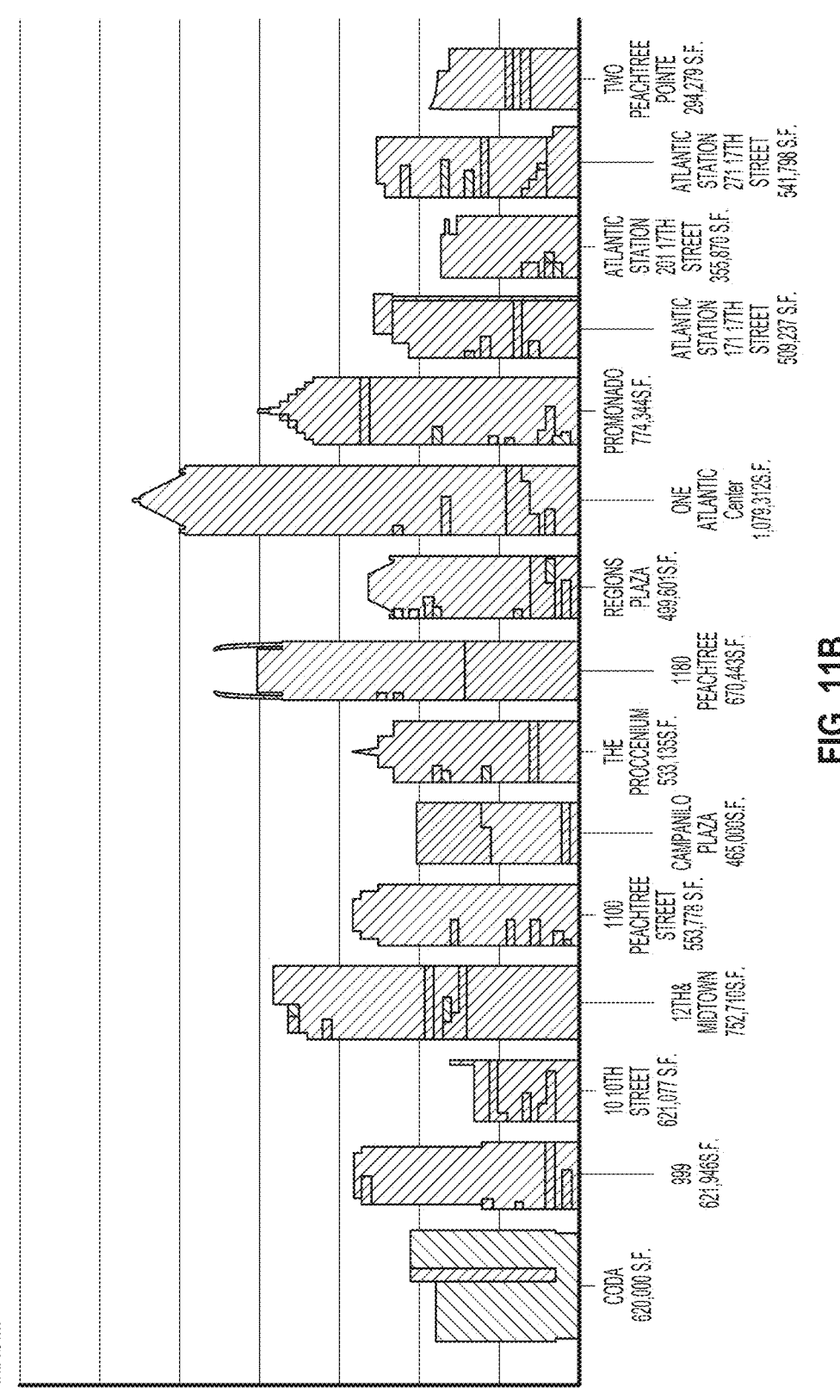
FIG. 11B is an exemplary interface illustrating an exemplary skyline report graph generated using the marketing computing system.
Figure 11C:
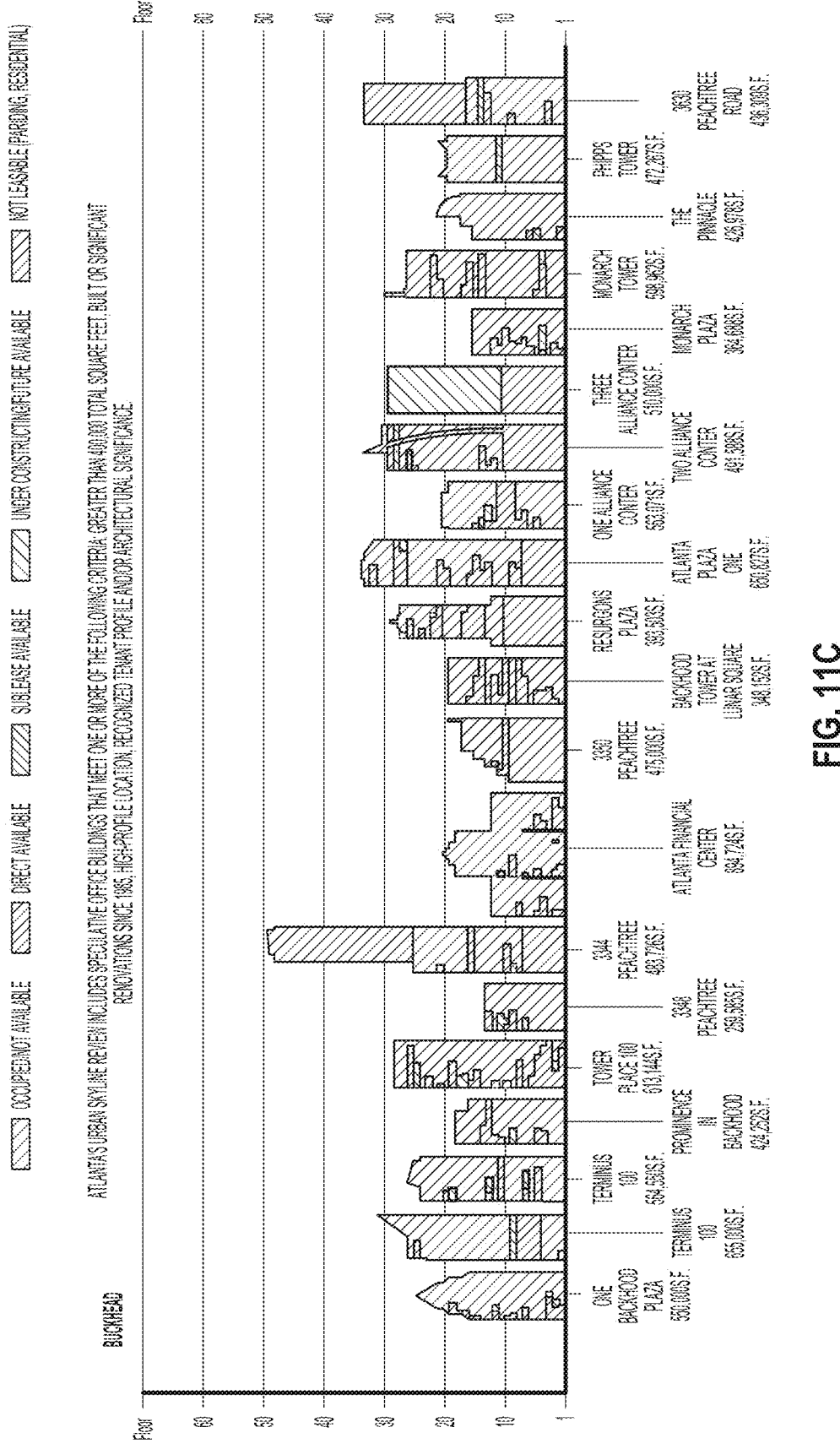
FIG. 11C is an exemplary interface illustrating an exemplary skyline report graph generated using the marketing computing system.
Figure 11D:
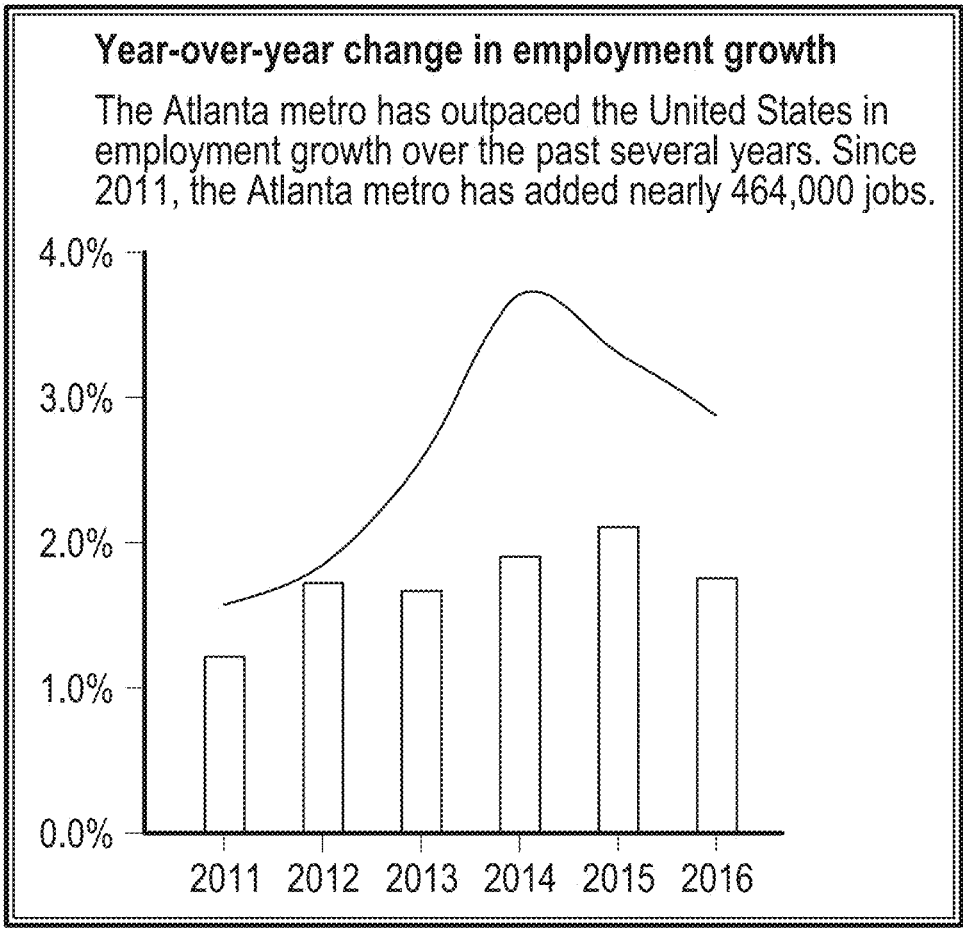
FIG. 11D is an exemplary interface illustrating an exemplary skyline report graph generated using the marketing computing system.
Figure 11E:
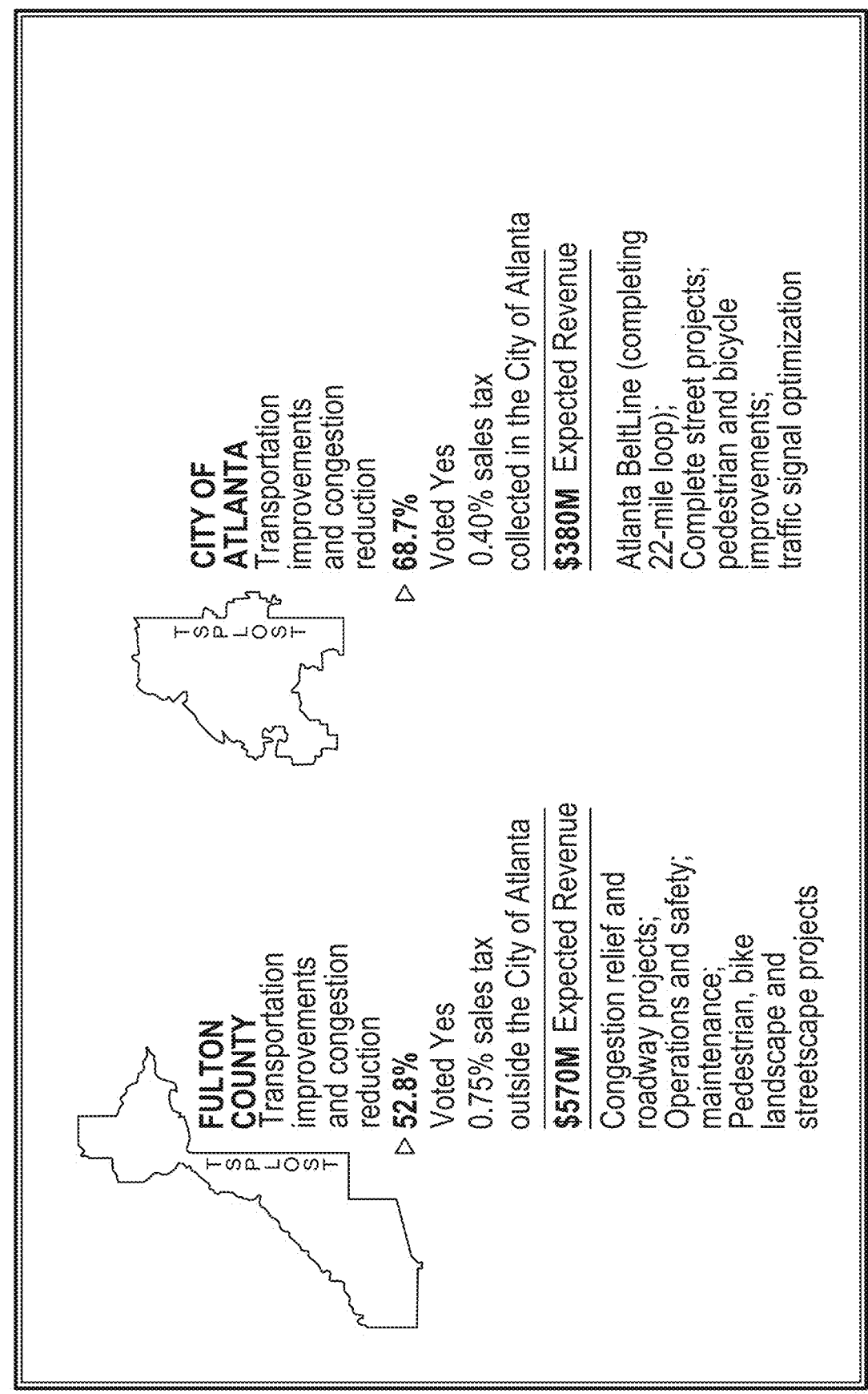
FIG. 11E is an exemplary interface illustrating an exemplary skyline report graph generated using the marketing computing system.
Figure 11E:
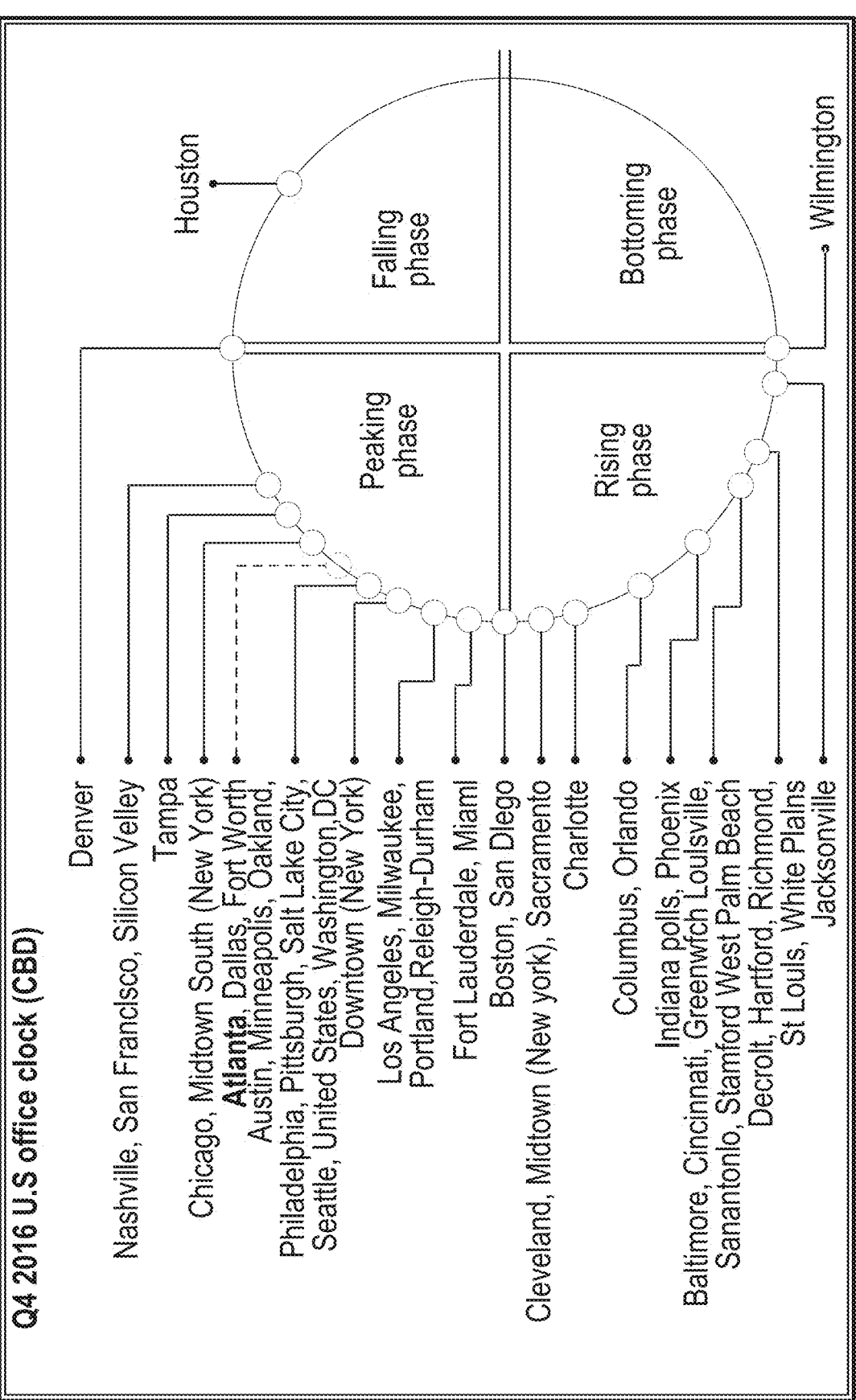

In another example, a broker could select a line chart, a stacked bars graph, a pic chart, or a scatter plot graph as the visualization option (as illustrated in FIG. 11D or 11E) to see trends related to the city as illustrated in FIG. 11D. In some examples, the visualization options can include other graphical representations of trends known in the art. In one non-limiting example, the visualization options can include combinations of known graphical representations such as a bar graph with a line chart as illustrated in FIG. 11D. The visualization option depicted in FIG. 11D portrays a trend over a range of years of employment data (retrieved from the marketing data) in Atlanta, Georgia. The report in FIG. 11E depicts a quarter trend of properties in the market data across major cities in the United States. The marketing computing system 12 can generate the report with the selected visualization option to include other trends related to properties using the building data or marketing data as well. Other trends include property prices over a time period (such as a bar graph of housing prices from the marketing data over the time period), rental rates over a time period (such as a line graph of the rental rates from the sublet average asking rents data over the period of time), vacancy rates in a city (such as a pic chart of the percentage of available unites in a housing market that are vacant or occupied at a particular time), property sales trends, property days on a market trends, population growth trends, unemployment trends, property tax trends, and other building or marketing trends known in the art.

Generating Reports

In step 315, the marketing computing system 12 generates a report by inputting the prompt, the selected attributes, and the selected visualization option into a machine learning model to generate the report. The marketing computing system 12 can generate the report by using the MLM 36 to extract the city from the prompt previously received from the client device at one of the client devices 16(1)-16(n). The marketing computing system 12 can update the hierarchal graphical user interface to include the report generated using the MLM 36. The updated hierarchal graphical user interface can be a modified hierarchal graphical user interface. The marketing computing system 12 can train the MLM 36 to accurately identify cities in prompts using training sets of exemplary prompts.

The marketing computing system 12 can also retrieve one or more data structures from a database at one of the databases 14(1)-(n). In one example, the marketing computing system 12 transmits an API request to MarketSphere and receives the one or more data structures in response to transmitting the API request. The marketing computing system 12 can also receive the one or more data structures by the client device at one of the client devices 16(1)-16(n). The data structure can be an array, list, table, graph, tree, queue, excel sheet, or other format of organized data known in the art. The one or more data structures can comprise the marketing data, or building data, or other data (such as demographic data, geographic data, behavioral data (such as related data to the marketing data including consumer behaviors or preferences)).

The one or more data structures may comprise actual data reflecting real-world conditions, events, and/or measurements. However, in some examples, disclosed systems and methods may fully or partially involve synthetic data (e.g., anonymized actual data or fake data). The one or more data structures may involve numeric data, text data, and/or image data. For example, the one or more data structures may include transaction data, financial data, demographic data, public data, government data, environmental data, traffic data, network data, transcripts of video data, genomic data, proteomic data, and/or other data. The one or more data structures may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

The one or more data structures may have a respective data schema (e.g., structure), including a data type, key-value pair, label, metadata, field, relationship, view, index, package, procedure, function, trigger, sequence, synonym, link, directory, queue, or the like. The one or more data structures may contain foreign keys, for example, data elements that appear in multiple datasets and may be used to cross-reference data and determine relationships between datasets. Foreign keys may be unique (e.g., a personal identifier) or shared (e.g., a postal code). The one or more data structures may be "clustered," for example, a group of datasets may share common features, such as overlapping data, shared statistical properties, or the like. Clustered datasets may share hierarchical relationships (e.g., data lineage). The marketing computing system 12 can construct representative vectors for the report using the data related to the city in the one or more data structures. The marketing computing system 12 can construct representative vectors of the data related to the city based on clusters by grouping similar data points together and representing each group as a single point in the vector. The marketing computing system 12 can use a clustering algorithm, such as K-means, to partition the data into distinct clusters based on certain similarity measures. After the clusters are formed, a representative value (like the centroid or the medoid) from each cluster is chosen to represent that cluster in the vector. The resulting vector can contains as many elements as there are clusters, with each element representing a summary of the data points of the marketing data or the building data in its corresponding cluster. The clusters can each represent data related to a property, building, residence, business, or a square foot of a property, building, residence, or business.

In one example, if the selected visualization option is a skyline report, the marketing computing system 12 can then generate graphical representations of the buildings by using data related to the structures of buildings in the city extracted from the prompt (the structure data may be available for reference in the one or more data structures). In some examples, the marketing computing system 12 can transmit an API call to a server of the plurality of servers 18(1)-18(n) (such as BlackBird tool) to receive an image of a building for the graphical representations of the buildings for as the structure data. The server of the plurality of servers 18(1)-18(n) can return a 3D representation of the building. The marketing computing system 12 can capture a 2D representation from a side (any side) of the 3D representation of the building for structure data for the graphical representation. This process can be completed for each building in the graphical representation. The marketing computing system 12 can then use the MLM 36 to compile a visualization report (i.e., the report) using the graphical representations of the buildings and the representative vectors by modifying the graphical representations of the buildings in the structure data to include shadings or colors representing the selected attributes of properties using the representative vectors. The building data and market data from the respective vectors can be matched to each 2D building representation in the structure data for the graphical representation by using a unique identifier that corresponds to each building, property, or square foot in the clusters (which is also shared by the 2D representation of a respective building in the structure data). In a non-limiting example, in FIG. 4, the buildings in the skyline report of Midtown Atlanta includes shading or colors to differentiate direct availability data, sublet availability data, and under construction data (additional shadings, colors, textures, or lines can be used to represent the different selected attributes for the report). The marketing computing system 12 can train the MLM 36 to be able to accurately identify the location of properties on the graphical representations of the buildings to accurately depict the shadings or color of a particular office located on a particular floor or a particular side of the graphical representation.

In another example, if the visualization option is a line chart, a stacked bars graph, a pie chart, a scatter plot graph, or another related chart known in the art, the marketing computing system 12 can use the MLM 36 to extract a time period from the prompt previously received from the client device at one of the client devices 16(1)-16(n). The marketing computing system 12 can train the MLM 36 to accurately identify time periods in prompts using training sets of exemplary time periods. If there is no time period in the prompt, the marketing computing system 12 can utilize a predetermined time period for the report. The prompt may also include a request for the trend to include in the report (the trends as outlined in step 310). The marketing computing system 12 can train the MLM 36 to accurately identify trend requests in prompts using training sets as well. The marketing computing system 12 can also train the MLM 36 to preprocess the representative vectors to identify related vectors to the trend in the prompt. The marketing computing system 12 can then generate the visualization report using a data visualization library to generate the selected visualization option from the related vectors.

In step 320, the marketing computing system 12 provides a modified hierarchal graphical user interface including the report generated in step 315 to the client device at one of the client devices 16(1)-16(n). The client device at one of the client devices 16(1)-16(n) can display the modified hierarchal graphical user interface as illustrated in FIGS. 4, 5, and 11A-11D. In some examples, as illustrated in FIG. 10, the marketing computing system 12 can modify the hierarchal graphical user interface to include a dialog window with interactive elements for the selection of export attributes for an export of the report. The dialog window can include a preview of the generated report as illustrated in FIG. 10. The export attributes can include a quality selection and/or format file type selection (such as jpeg, pdf, .doc, .docx, gif, and other export formats known in the art). The marketing computing system 12 can receive the selected export attributes, via the hierarchal graphical user interface, from the client device at one of the client devices 16(1)-16(n). The marketing computing system 12 can then generate an export file based on the format file type selection. The marketing computing system 12 can include the report in the export file with a certain level of quality based on the quality selection. In some examples, the export attributes may include a file location for where to store the export file. The marketing computing system 12 can store the file at the file location as well. At step 325, the exemplary process terminates.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method comprising:

providing, by a computing device, a hierarchal graphical user interface with selectable attributes and visualization options in response to a prompt from a client device, wherein the hierarchal graphical user interface is generated prior to the transmission to the client device;

generating, by the computing device, a report by inputting the prompt, selected attributes, and a selected visualization option into a machine learning model to generate the report, wherein the machine learning model is configured to use marketing data, building data, or combinations thereof for the generation of the report;

retrieving or receiving, by the computing device, one or more data structures comprising the marketing data or the building data;

constructing, by the computing device, representative vectors for buildings in the one or more data structures using the marketing data and the building data;

generating, by the computing device, graphical representations of the buildings;

compiling, by the computing device, a visualization report using the graphical representations, wherein the report is the visualization report; and updating and providing, by the computing device, a modified hierarchal graphical user interface to the client device, wherein the modified hierarchal graphical user interface is the hierarchal graphical user interface modified to comprise the generated report.

2. The method as set forth in claim 1, wherein the graphical representations of the buildings represent a city when the selected visualization option is a skyline view.

3. The method as set forth in claim 2, further comprising:

receiving, by the computing device from the client device, the selected attributes from among the selectable attributes, wherein the selectable attributes comprise direct availability data, sublet availability data, under construction data, direct vacancy data, sublet vacancy data, direct average asking rents data, sublet average asking rents data, direct absorption data, sublet absorption data, proposed data, and combinations thereof.

4. The method as set forth in claim 3, wherein the graphical representations are in a shape of a building with shadings or colors to represent occupancy or the selected attributes.

5. The method as set forth in claim 1, wherein the machine learning model is trained to generate the report using the marketing data and building data by:

retrieving or receiving, by the computing device, one or more data structures comprising the marketing data or the building data;

generating, by the computing device, a graphical representation of the marketing data or the building data; and compiling, by the computing device, the report using the graphical representations.

6. The method as set forth in claim 5, further comprising:

receiving, by the computing device from the client device, the selected visualization option from among the visualization options, wherein the visualization options comprise a line chart, a stacked bars graph, a pie chart, or a scatter plot graph.

7. The method as set forth in claim 6, wherein the graphical representation corresponds to the selected visualization option.

8. The method as set forth in claim 5, wherein the one or more data structures are received in response to transmitting an API request to MarketSphere.

9. The method as set forth in claim 1, wherein generating the graphical representations of the buildings comprises capturing a 2D representation from a 3D representation of each building.

10. A marketing computing system comprising:

one or more processors;

a memory comprising programmed instructions stored thereon, the one or more processors configured to be capable of executing the stored programmed instructions to:

provide a hierarchal graphical user interface with selectable attributes and visualization options in response to a prompt from a client device, wherein the hierarchal graphical user interface is generated prior to the transmission to the client device;

generate a report by inputting the prompt, selected attributes, and a selected visualization option into a machine learning model to generate the report, wherein the machine learning model is configured to use marketing data, building data, or combinations thereof for the generation of the report;

retrieve or receive one or more data structures comprising the marketing data or the building data;

construct representative vectors for buildings in the one or more data structures using the marketing data and the building data;

generate graphical representations of the buildings;

compile a visualization report using the graphical representations, wherein the report is the visualization report; and update and provide a modified hierarchal graphical user interface to the client device, wherein the modified hierarchal graphical user interface is the hierarchal graphical user interface modified to comprise the report.

11. The system as set forth in claim 10, wherein the executable code when executed by the one or more processors further causes the one or more processors to:

receive, using the one or more processors from the client device, the selected attributes from among the selectable attributes, wherein the selectable attributes comprise direct availability data, sublet availability data, under construction data, direct vacancy data, sublet vacancy data, direct average asking rents data, sublet average asking rents data, direct absorption data, sublet absorption data, proposed data, and combinations thereof, and wherein the graphical representations are in a shape of a building with shadings or colors to represent occupancy or the selected attributes.

12. The system as set forth in claim 10, wherein the machine learning model is trained to generate the report using the marketing data and building data by:

retrieving or receiving, using the one or more processors, one or more data structures comprising the marketing data or the building data;

generating, using the one or more processors, a graphical representation of the marketing data or the building data; and compiling, using the one or more processors, the report using the graphical representations.

13. The system as set forth in claim 12, wherein the executable code when executed by the one or more processors further causes the one or more processors to:

receive, using the one or more processors from the client device, the selected visualization option from among the visualization options, wherein the visualization options comprise a line chart, a stacked bars graph, a pie chart, or a scatter plot graph, and wherein the graphical representation corresponds to the selected visualization option.

14. The system as set forth in claim 10, wherein the graphical representations of the buildings represent a city when the selected visualization option is a skyline view.

15. A non-transitory computer readable medium having stored thereon instructions comprising executable code which when executed by one or more processors, causes the one or more processors to:

provide a hierarchal graphical user interface with selectable attributes and visualization options in response to a prompt from a client device, wherein the hierarchal graphical user interface is generated prior to the transmission to the client device;

generate a report by inputting the prompt, selected attributes, and a selected visualization option into a machine learning model to generate the report, wherein the machine learning model is configured to use marketing data, building data, or combinations thereof for the generation of the report;

retrieve or receive one or more data structures comprising the marketing data or the building data;

construct representative vectors for buildings in the one or more data structures using the marketing data and the building data;

generate graphical representations of the buildings;

compile a visualization report using the graphical representations, wherein the report is the visualization report; and update and provide a modified hierarchal graphical user interface to the client device, wherein the modified hierarchal graphical user interface is the hierarchal graphical user interface modified to comprise the report.

16. The non-transitory computer readable medium as set forth in claim 15, wherein the executable code when executed by the one or more processors further causes the one or more processors to:

receive, using the one or more processors from the client device, the selected attributes from among the selectable attributes, wherein the selectable attributes comprise direct availability data, sublet availability data, under construction data, direct vacancy data, sublet vacancy data, direct average asking rents data, sublet average asking rents data, direct absorption data, sublet absorption data, proposed data, and combinations thereof, and wherein the graphical representations are in a shape of a building with shadings or colors to represent occupancy or the selected attributes.

17. The non-transitory computer readable medium as set forth in claim 15, wherein the machine learning model is trained to generate the report using the marketing data and building data by:

retrieving or receiving, using the one or more processors, one or more data structures comprising the marketing data or the building data;

generating, using the one or more processors, a graphical representation of the marketing data or the building data; and compiling, using the one or more processors, the report using the graphical representations.

18. The non-transitory computer readable medium as set forth in claim 17, wherein the executable code when executed by the one or more processors further causes the one or more processors to:

receive, using the one or more processors from the client device, the selected visualization option from among the visualization options, wherein the visualization options comprise a line chart, a stacked bars graph, a pie chart, or a scatter plot graph, and wherein the graphical representation corresponds to the selected visualization option.

19. The non-transitory computer readable medium as set forth in claim 17, wherein the one or more data structures are received in response to transmitting an API request to MarketSphere.

20. The non-transitory computer readable medium as set forth in claim 15, wherein the graphical representations of the buildings represent a city when the selected visualization option is a skyline view.

* * * * *